Patented Aug. 19, 1947

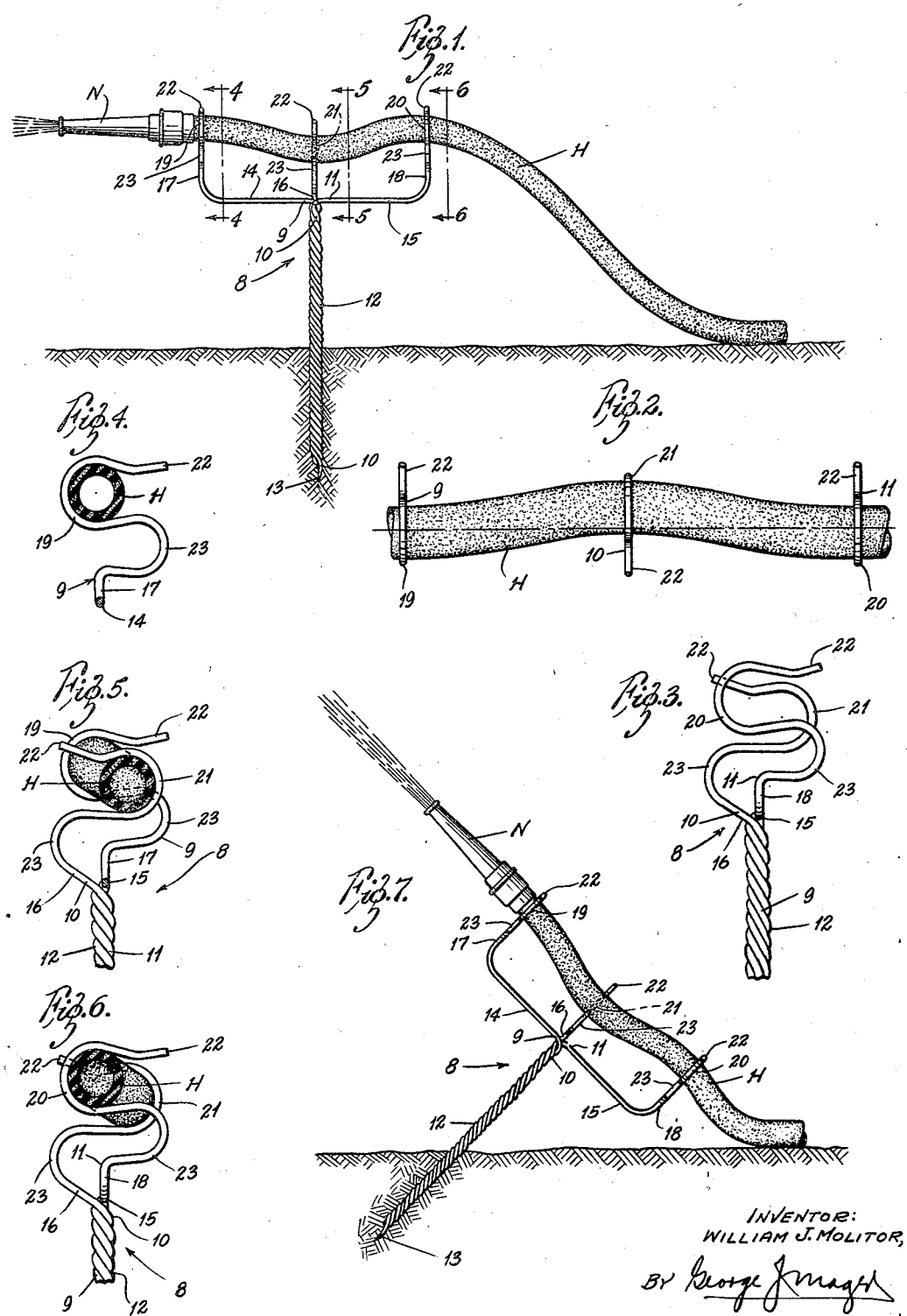

2,425,893

UNITED STATES PATENT OFFICE 2,425,893

GARDEN HOSE HOLDER

William J. Molitor, St. Louis, Mo.

Application June 7, 1945, Serial No. 598,045

3 Claims. (Cl. 248—87)

This invention relates generally to a garden hose holder; and it has particular reference to a device for supporting and holding the nozzle end of a garden or lawn hose during its use. The device may be easily thrust into the ground at any desired locale to point the hose nozzle horizontally or angularly in any direction, and is adapted to maintain said nozzle in such selected position at various planes above the ground level.

Objects of the invention are to provide an improved garden hose support including means for attaching the device to the ground for swivel movements, means for maintaining the nozzle of the hose supported thereby in various selected planes relative to the ground, and novel means for releasably engaging that portion of the hose adjacent said nozzle adapted to obviate fortuitous displacement thereof when in use.

A further object of the invention is to provide a hose support composed of a plurality of strands of relatively heavy resilient wire, so formed or bent as to include a twisted stem or standard portion terminating in a prong adapted to be readily imbedded in the ground, a central open loop portion adapted to receive and releasably embrace a portion of the hose, and one or more similar loop portions in laterally spaced relation relative the central loop adapted to receive and releasably embrace a portion of the hose, and one or more similar loop portions in laterally spaced relation relative the central loop adapted to receive and releasably embrace other portions of said hose.

Another object is to so form the retaining loops that the hose receiving opening of the central loop or clamp is disposed oppositely to the hose receiving openings of the end or side loops, whereby manual insertion of the hose into said loops is a simple operation, but accidental displacement of the hose therefrom is prevented.

Further objects are to form the device in such manner that the end loops are offset relative the central loop both vertically and horizontally, to provide means on each loop facilitating entry of the hose, and to form the loop-supporting arms of the device in a manner adapted to increase the inherent resiliency of the hose engaging portion of each loop in order to accommodate a hose of a somewhat smaller or a larger size.

Another object is to provide a device which may be manually rotated while in operation to change the direction of the stream issuing from the nozzle.

Other objects and advantages of my improved garden or lawn hose holder will be apparent from the following detailed description thereof, reference being had to the annexed drawing, wherein:

Fig. 1 is a front elevational view of my invention in use, the nozzle of the hose supported thereby being disposed in a substantially horizontal plane;

Fig. 2 is a plan view of a portion of Fig. 1 on an enlarged scale;

Fig. 3 is a right end elevational view of the upper portion of the device, prior to insertion of the hose;

Figs. 4, 5 and 6 are enlarged vertical cross-sectional views taken on the lines 4—4, 5—5, and 6—6, respectively, of Fig. 1; and Fig. 7 is a view similar to Fig. 1 with the device and the nozzle of the hose supported thereby in an angular plane.

In the preferred embodiment of my invention which is illustrated in said drawing, the holder, generally designated 8, is formed of three lengths or strands of relatively heavy resilient wire designated 9, 10 and 11. The standard or stem portion 12 is formed by twisting the three wires as illustrated, and terminates in a pointed tip or prong 13 facilitating its entry into the ground. The prong 13, incidentally, is provided by sharpening the lower extremity of the wire 10.

As shown particularly in Fig. 1, the wire 9 upon emergence from the twisted stem portion 12 is bent to form a lateral extension 14 in a substantially horizontal plane approximately at a right angle relative to said stem. The wire 11 is likewise bent to provide a similar extension 15, while the wire 10 emerges from the twisted stem in the form of a vertical arm 16.

At a suitable distance from the stem, the wire 9 is again bent to form an upstanding vertical arm 17. Similarly, the wire 11 is again bent to form an upstanding vertical arm 18.

Upward beyond its vertical arm portion, each wire is bent to form a loop adapted to grip a portion of garden hose H in the vicinity of the nozzle N associated therewith.

Thus the wire 9 is formed to provide the loop or clamp 19, best seen in Fig. 4, its hose receiving and embracing portion having its opening to the right of the vertical centerline of the device. The wire 11, as best seen in Fig. 6, is formed to provided the loop 20, similar in all respects to the loop 19. The wire 10 is formed to provide the loop or clamp 21, best seen in Fig. 5, its hose receiving and embracing portion, however, having its opening located approximately at the vertical centerline of the device.

It is therefore apparent that the end loops or clamps 19 and 20 are in alinement with one another, whereas the central or intermediate loop 21 is offset relative thereto in a horizontal plane, as shown especially in Fig. 2. In addition, as particularly illustrated in Figs. 1 and 3, the end clamps 19 and 20 are disposed at a higher elevation than is the intermediate clamp 21.

By this arrangement, fortuitous displacement of the hose H by the water pressure during sprinkling or spraying operations is obviated. After a selected area of lawn or the like has been sprinkled, the relative vertically and horizontally offset arrangement of the loops likewise prevents accidental egress of the hose while the device is being manually rotated to direct the stream of water to another spot or area.

As shown in the drawing, each loop terminates at its upper end in an upwardly bent guide portion 22 which facilitates insertion of the hose. The connection between each loop and its vertical supporting arm comprises a portion 23 reversely bent relative to its associated loop. Thus additional resiliency is added to the inherent resiliency of the loops, whereby they may be compressed or extended to admit and yieldingly grip a hose of a somewhat larger or somewhat smaller size than that illustrated.

From the foregoing, it is evident that my invention attains all its intended objects and purposes economically as well as efficiently. The holder is portable, may be easily and quickly positioned in the ground at various angles and elevations, and may subsequently be rotated, elevated or lowered and its location changed without the necessity of shutting off the water supply.

While the preferred embodiment of the device has been illustrated and described in detail, I contemplate such variations in its construction as may be made without departing from the nature and principle of the invention as defined by the appended claims.

I claim:

1. A device of the character described including means for attaching same to the ground comprising a vertical stem portion terminating in a prong, means for supporting a pair of resilient hose receiving and retaining clamps in a selected plane comprising a pair of oppositely extending horizontally disposed members formed at right angles to the stem at the upper end thereof, an upstanding vertical arm in spaced relation relative said stem carried by each horizontal member, a reversely bent loop portion connecting each clamp with one of said upstanding vertical arms, and means for supporting a resilient hose receiving and retaining clamp located intermediately said pair of clamps in a selected plane offset both vertically and horizontally from that selected for said pair of clamps comprising a vertical arm extending upwardly from said stem at the upper end thereof, and a reversely bent loop portion connecting said intermediate clamp with said arm.

2. A garden hose holder composed of relatively heavy resilient wire comprising a vertical standard, a pointed tip forming its lower extremity, a pair of oppositely disposed lateral extensions formed at right angles to and attached to said standard at the upper end thereof, an upstanding arm formed on the end of each lateral extension in spaced relation to the centerline of said standard, an intermediate upstanding arm attached to and supported by said standard substantially at the centerline thereof, a hose clamp formed on each upstandingg arm, a hose receiving opening in each clamp, the opening in the clamp formed on the intermediate arm being disposed oppositely to the opening in the clamp formed on each of said spaced arms, the opening in the clamp formed on the intermediate arm being offset both in a vertical plane and in a horizontal plane relative to the opening in the clamp formed on each of said spaced arms, each of the upstanding arms having formed therein a portion bent reversely with respect to its adjacent clamp, and each clamp opening being provided with a guide member to facilitate insertion of the hose thereinto.

3. A garden hose holder composed of strands of relatively heavy but resilient wire twisted together throughout a portion of their lengths to constitute a vertical standard, a prong on the lower end of said standard, a pair of horizontal, oppositely disposed lateral extensions at the upper end of said standard, a vertically upwardly extending arm of said standard, a hose clamp formed on each upwardly extending arm, a hose receiving opening in each clamp, the opening on the intermediate arm being disposed oppositely to the hose receiving openings of said lateral extensions and offset therefrom both in a vertical plane and in a horizontal plane, a portion reversely bent with respect to its adjacent clamp on each arm, and a guide member on each arm adjacent its clamp opening to facilitate insertion of the hose thereinto.

WILLIAM J. MOLITOR.

REFERENCES CITED

The following references are of record in the file of this patent:

UNITED STATES PATENTS

| Number | Name | Date |
|---|---|---|
| 518,986 | Cain | May 1, 1894 |
| 674,161 | Brown | May 14, 1901 |
| 1,367,780 | Jolliff | Feb. 8, 1921 |
| 1,534,438 | Abby | Apr. 21, 1925 |
| 1,591,374 | Hammill | July 6, 1926 |